United States Patent [19]

Sho

[11] Patent Number: 5,434,355
[45] Date of Patent: Jul. 18, 1995

[54] FLOOR BOARD ASSEMBLY

[76] Inventor: Jen-Tai Sho, No. 40, Kofeng Street, Taichung City, Taiwan

[21] Appl. No.: 141,076

[22] Filed: Oct. 26, 1993

[51] Int. Cl.⁶ ............................................... E04B 5/58
[52] U.S. Cl. .................... 174/48; 52/126.2; 52/220.3; 361/601; 361/827
[58] Field of Search ............... 174/48; 439/DIG. 925; 307/147; 52/126.4, 126.1, 126.2, 126.5, 220.2, 263, 220.3; 361/601, 622, 641, 823, 826, 827

[56] References Cited

U.S. PATENT DOCUMENTS

| | | | |
|---|---|---|---|
| 4,085,557 | 4/1978 | Tharp | 52/263 |
| 4,124,324 | 11/1978 | Augis et al. | 404/3 |
| 4,593,499 | 6/1986 | Kobayashi et al. | 52/126.6 |
| 4,596,095 | 6/1986 | Chalfant | 52/126.6 |
| 4,773,196 | 9/1988 | Yoshida | 174/48 |
| 5,057,647 | 10/1991 | Bogden et al. | 174/48 |
| 5,202,537 | 4/1993 | Nusbaum | 174/48 |
| 5,270,490 | 12/1993 | Yang | 174/48 |

OTHER PUBLICATIONS

Modular Raised Floor, IBM Tech Discl Bull, Wheeler et al, vol. 12 No. 6 Nov. 1969, pp. 827.

*Primary Examiner*—Gerald P. Tolin
*Attorney, Agent, or Firm*—Beveridge, DeGrandi, Weilacher & Young

[57] ABSTRACT

A floor board assembly includes four base plates connected around a center plate on the same plane, a cover board covered on the center plate, four lining plates covered on the base plates, four blocking plates connected to the center plate at four sides and bridged over either two base plates and disposed in flush with the lining plates, the base plate having open blocks spaced from one another for passing electric wires through spaces therebetween, the center plate having upright rods with a respective screw holes for mounting an electric socket after the removable of the cover board, the blocking plates having rows of sharp projections for fasten the floor covering being covered over the floor board assembly.

7 Claims, 4 Drawing Sheets

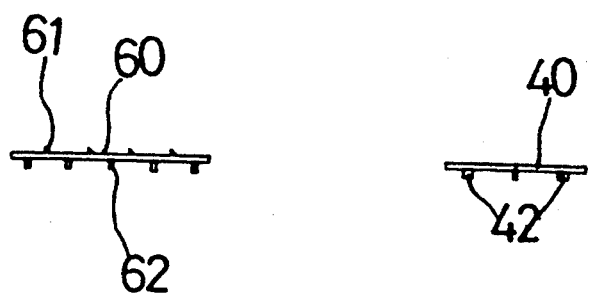
FIG. 2A
FIG. 2B
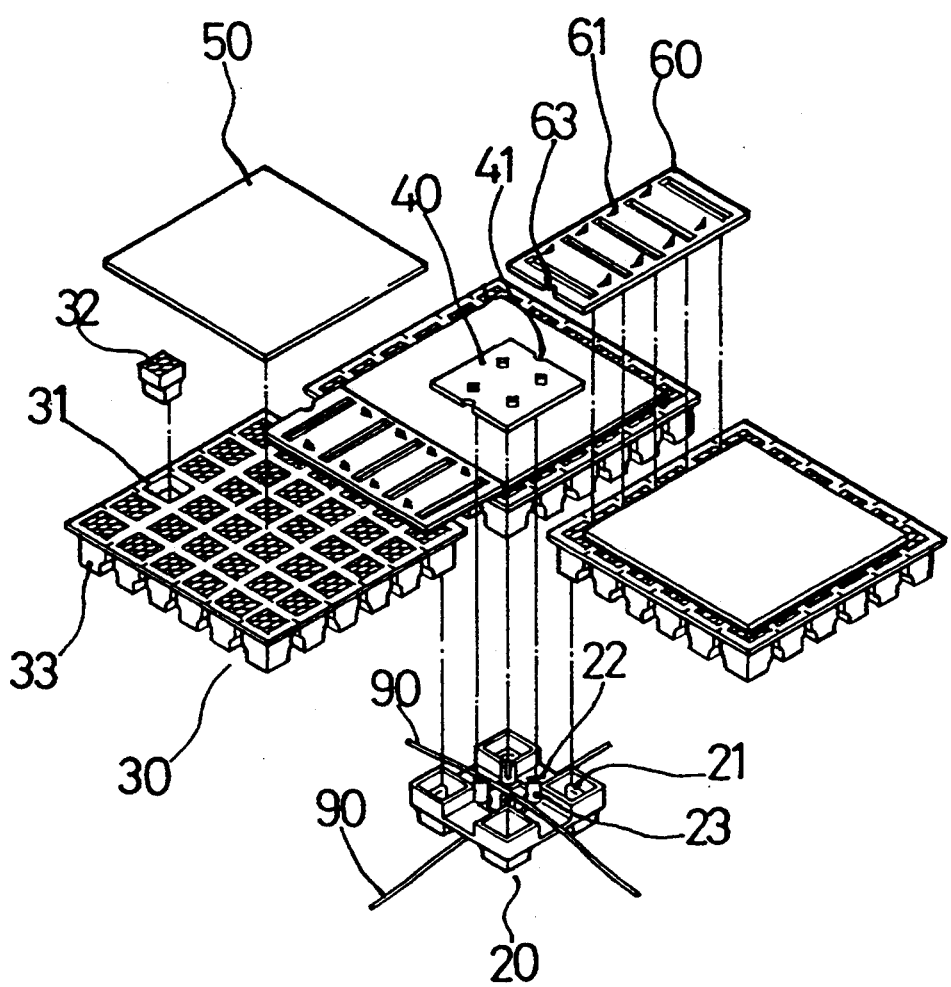
FIG. 2

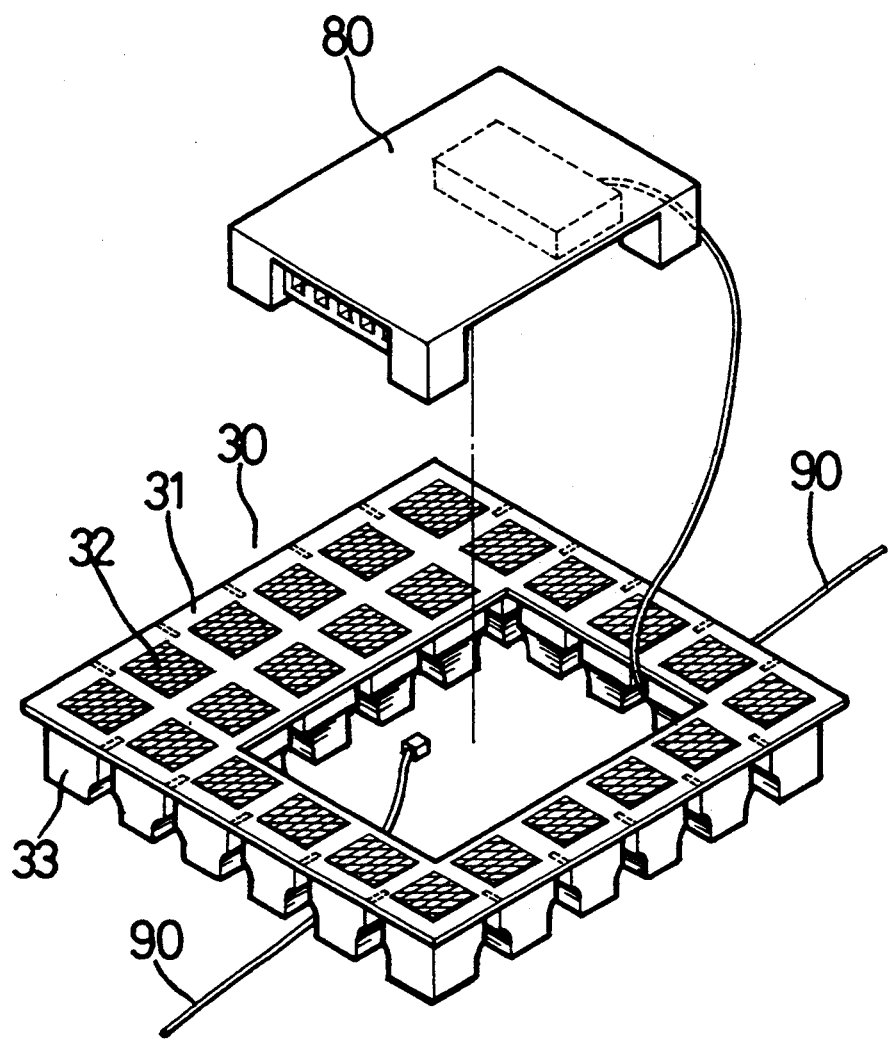
F I G. 5

FLOOR BOARD ASSEMBLY

BACKGROUND OF THE INVENTION

The present invention relates to a floor board assembly for use in floor construction which has spaces for passing electric wires and which permits any of a variety of electric sockets to be installed conveniently.

According to conventional installation procedures, the arrangement of the electric wiring in a house cannot be conveniently changed once it was fixed. Because the electric wiring in a house is generally exposed to the outside, it destroys the sense of beauty of the interior of the house. Further, in an office, new office automation apparatus may be added and installed in any place, and the arrangement of the electric wiring may have to be changed. If the locations and quantity of the outlets of the electric wiring in an office cannot meet the requirements, it is very difficult and expensive to change the arrangement of the electric wiring.

In order to eliminate the aforesaid problems, floor board assemblies have been commonly used. FIG. 1 shows a floor board assembly according to the prior art, which was disclosed in 1987 by a Japanese electrical company. The floor board assembly is comprised of a base plate (10) having spaced blocks (101), a bridging plate (11), a locating plate (12), a crossed cover plate (13), and a plug (14). A crossed passage way (102) is defined between the blocks (101) on the base plate (10) for passing electric cables longitudinally as well as transversely. The bridging plate (11) has a top surface (111) disposed on the same elevation with the topmost edge of the blocks (101). The locating plate (12) has a center hole (121) for passing an electric cable out of the floor. The crossed cover plate (13) blocks the crossed passage way (102) at the top. The plug (14) inserts through a plug hole (131) on the crossed cover plate (13) into the center hole (121) on the locating plate (12) when there is no electric cable to be inserted therethrough. This structure of floor board assembly allows electrical cables to be arranged under the floor and kept from sight. However, it still has drawbacks. One disadvantage of this structure of floor board assembly is that an electric socket cannot be directly mounted on the base plate. If an electric socket is to be mounted on the base plate, the crossed cover plate must be removed. However, the crossed passage way will expose to the outside if the crossed cover plate is removed. Another drawback of this structure of floor board assembly is that the carpet or floor covering which is covered on the floor board assembly must be adhered or fastened to the floor board assembly by an adhesive agent or fastening devices or it will slip on the smooth top surface of the crossed cover plate. Still another drawback of this structure of floor board assembly is that the base plate cannot be cut to provide a chamber for holding a junction box or the like while the crossed passage way is maintained intact for passing electric wires,

SUMMARY OF THE INVENTION

The present invention eliminates the aforesaid drawbacks, It is therefore an object of the present invention to provide a floor board assembly which permits electric wires to be arranged under the floor and kept from sight. It is another object of the present invention to provide a floor board assembly allows any of a variety of electric sockets or junction boxes to be directly mounted thereon. It is still another object of the present invention to provide a floor board assembly which can be conveniently assembled and installed. It is still another object of the present invention to provide a floor board assembly which absorbs shocks. It is still another object of the present invention to provide a floor board assembly which automatically fits over the floor ground surface. It is still another object of the present invention to provide blocking plates for the floor board assembly which automatically hold the carpet or floor covering in place once the carpet or floor covering is covered over the floor board assembly.

BRIEF DESCRIPTION OF THE DRAWINGS

FIG. 2 is an exploded view of a floor board assembly according to the preferred embodiment of the present invention;

FIGS. 2A and 2B are respective side views of the blocking plate and cover board.

FIG. 5 shows the installation of a concealed electric socket in the floor board assembly shown in FIG. 2.

DETAILED DESCRIPTION OF THE PREFERRED EMBODIMENT

Figure 1:
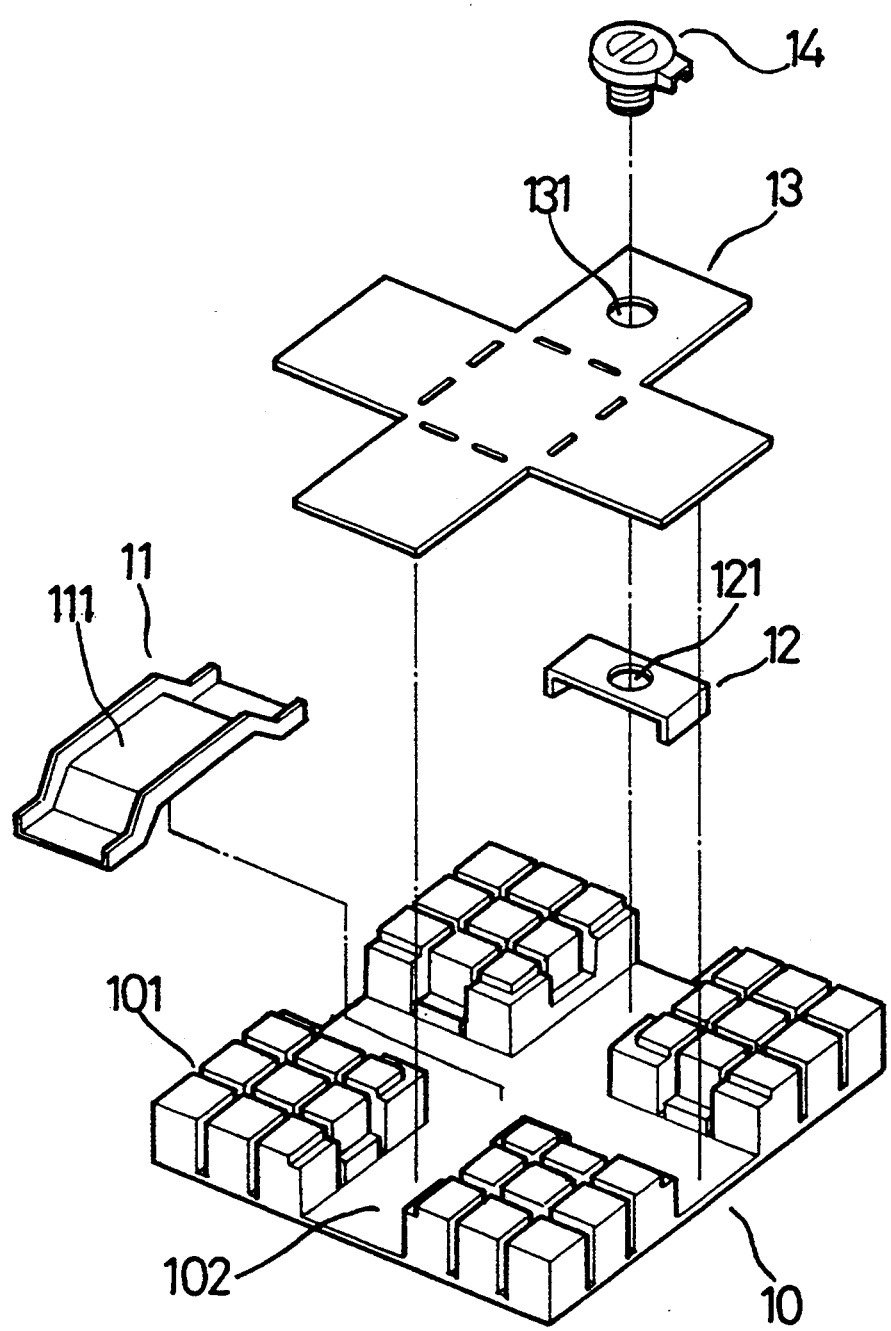
FIG. 1 is an exploded view of a floor board assembly according to the prior art.
Figure 3:
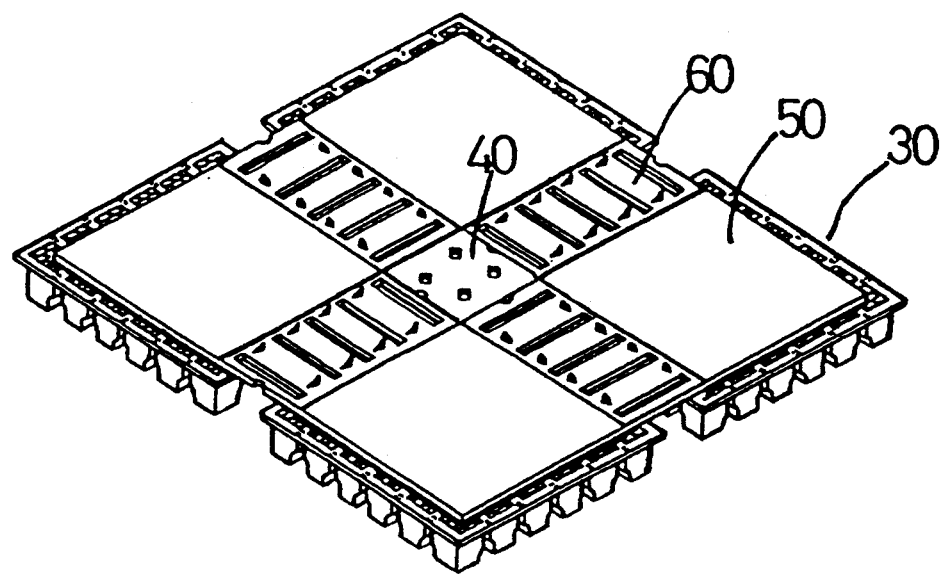
FIG. 3 is an elevational view of the floor board assembly shown in FIG. 2.

Referring to FIGS. 2 and 3, a floor board assembly in accordance with the present invention is generally comprised of a center plate 20, four base plates 30 connected together on the same plane by the center plate 20, a cover board 40 covered on the center plate 20, four lining plates 50 respectively covered on the base plates 30, and four blocking plates 60 respectively connected to the center plate 20 at four sides and bridged over the base plates 30 in flush with the lining plates 50.

The center plate 20 is made of square shape having four open blocks 21 spaced around the four corners thereof, and four upright rods 23 spaced around four corners within the open blocks 21. Each upright rod 23 has a horizontal top groove 22 and a screw hole 24 in the center of the horizontal top groove 22.

The base plate 30 is molded from a flexible plastic material, comprised of a square box body 31 having a plurality of longitudinally and transversely aligned open blocks 33, and a plurality of solid plugs 32 respectively fitted into the open blocks 33. By fitting the open block 33 in either corner into either open block 21 on the center plate 20, four base plates 30 are connected to the center block 20 around four sides.

The cover board 40 is made of square shape in size relatively smaller than the center plate, having two half-round notches 41 on two opposite sides thereof in the middle, and four short bottom strips 42 respectively fitted into the horizontal top groove 22 on either upright rod 23 of the center plate 20.

The lining plate 50 is made from a flexible material of square shape in size relatively smaller than the base plate 30. When covering over a base plate 30, the lining plate 50 is disposed in flush with the blocking plates 60.

The blocking plate 60 is made from a flexible material of rectangular shape comprising two longitudinal rows of sharp projections 61 bilaterally raised from the top surface thereof for binding the carpet or the like to be covered on the floor board assembly, two longitudinal rows of bottom pegs 62 extended from the bottom surface thereof and respectively fitted into respective spaces (not shown) between the open blocks 33 on either base plate 30, and a half-round notch 63 on one short side thereof in the middle.

When assembled, electric wires 90 can be inserted through the gaps between the base plates 30 as well as the gaps between the open blocks 21;33. The half-round notch 63 of the blocking plate 60 is provided to match with either half-round notch 41 on the cover board 40 into a round hole for passing electric wires 90. If there are no electric wires to be drawn out of the floor board assembly, the half-round notch 41 of the blocking plate 60 is spaced from the half-round notch 41 of the cover board 40.

Figure 4A:
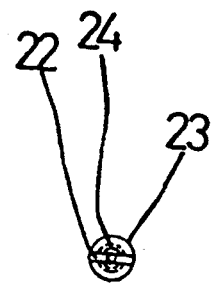
FIG. 4A is a plan view of a tie screw located in an upright rod.
Figure 4:
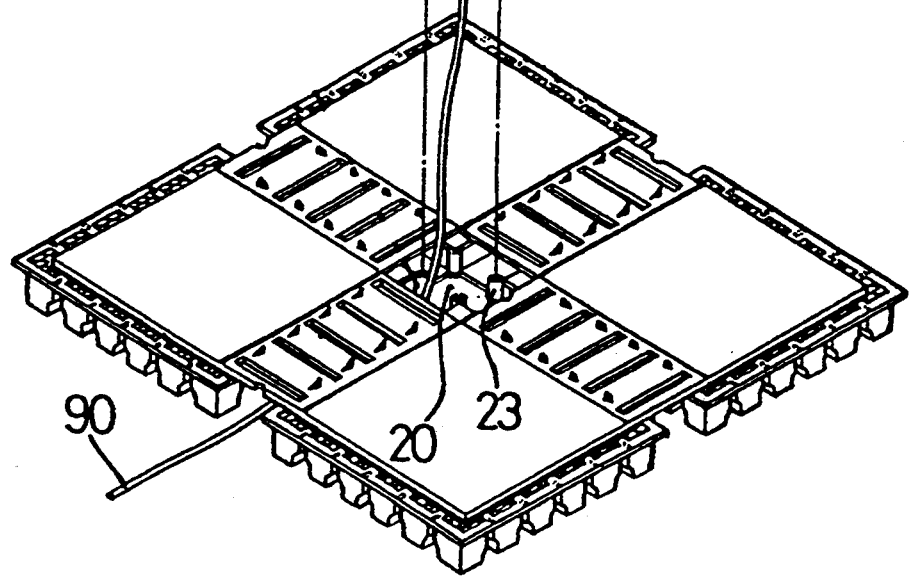
FIG. 4 shows the installation of an open type electric socket in the floor board assembly shown in FIG. 2.

Referring to FIG. 4, an open type electric socket 70 may be installed in the floor board assembly by threading tie screws 71 through holes (not shown) on the open type electric socket 70 into the screw hole 22 on either upright rod 23 of the center block 20 after the cover board 40 was removed.

Referring to FIG. 5, a concealed electric socket 80 may be installed in the floor board assembly by cutting an opening on either base plate 30 for receiving the electric socket 80. The electric socket shown in FIG. 5 is a commercially available product having a power outlet for connecting an electric plug and a telephone jack for connecting a telephone. As the electric socket is not within the scope of the invention, it is not described in detail. The important thing is that the opening is cut according to the size of the electric socket to be installed. After the installation of the electric socket 80, the respective lining plate 50 is then covered over the electric socket 80. As the base plate 30 is molded from a flexible plastic material, it can be conveniently cut with a cutting tool.

As the blocking plates 60 have longitudinal rows of sharp projections 61 on the top, the carpet or floor covering can be firmly retained in place by the sharp projections 61 once it was covered on the floor board assembly. As the base plates 30 are spaced from one another, and the open blocks 33 of the base plates 30 and the open blocks 21 of the center plate 20 are respectively spaced by gaps, electrical wires can be inserted through gaps therebetween in either direction. Because the base plates 30, the lining plates 50, and the blocking plates 60 are flexible, the floor board assembly fits uneven floors and can absorb shocks.

While only one embodiment of the present invention has been shown and described, it will be understood that various modifications and changes could be made without departing from the spirit and scope of the invention.

What is claimed is:

1. A floor board assembly comprising:
a center plate made of square shape having four open blocks spaced around four corners thereof, and four upright rods spaced around four corners within the open blocks thereof, each upright rod having a horizontal top groove and a screw hole in the middle of the horizontal top groove;

four square base plates respectively connected to said center plate at four sides on the same plane, each base plate comprising a plurality of longitudinally and transversely aligned open blocks spaced from one another at equal pitch, a plurality of solid plugs respectively fitted into the open blocks of the respective base plate, and a plurality of mounting holes spaced by said solid plugs on a top surface, the open block in one corner of each base plate being fitted into the open block in either corner of said center plate;

a cover board made of square shape in size relatively smaller than said center plate and covered on said center plate, said cover board having two half-round notches on two opposite sides thereof in the middle, and four short bottom strips respectively fitted into the horizontal top groove on either upright rod of said center plate;

four lining plates respectively made of square shape in size relatively smaller than said base plates and respectively covering said base plates;

four blocking plates respectively abutting said center plate at four sides of said center plate, each blocking plate connecting two corresponding base plates and being retained between two corresponding lining plates in a flush mount relationship therewith, each blocking plate including two longitudinal rows of bottom pegs bilaterally extending from a bottom surface thereof and being fitted into said mounting holes on said base plates.

2. The floor board assembly of claim 1 wherein each blocking plate has a half-round notch on one side for matching with a half-round notch on said cover board for inserting electric wires.

3. The floor board assembly of claim 1 wherein said cover board may be removed from said center plate for mounting an electric socket on said center plate by threading tie screws on said electric socket into the screw hole on an upright rod of said center plate.

4. The floor board assembly of claim 1 wherein one of said base plates is made with an opening to hold an electric socket.

5. The floor board assembly of claim 1 wherein said blocking plates have longitudinal rows of sharp projections on the top retaining surface for a floor covering over the floor board assembly.

6. The floor board assembly of claim 1 wherein wire gaps are defined between the open blocks of said base plates for passing electric wires beneath said lining plates.

7. The floor board assembly of claim 1 wherein said base plates, said lining plates, and said blocking plates are respectively made from flexible materials.

* * * * *